Patented Jan. 23, 1940

2,188,160

UNITED STATES PATENT OFFICE 2,188,160

COLORATION OF ARTIFICIAL TEXTILE AND OTHER MATERIALS

James Henry Rooney and Bernard Shaw, Spondon, near Derby, England, assignors to Celanese Corporation of America, a corporation of Delaware No Drawing. Application October 2, 1937, Serial No. 167,038. In Great Britain October 9, 1936

4 Claims. (Cl. 8—4)

This invention relates to improvements in or relating to the coloration and other treatments of textile and other materials, and particularly to improvements in or relating to the coloration and other treatments of artificial filaments, ribbons, foils, films and similar materials especially of cellulose acetate and other organic derivatives of cellulose.

Artificial foils, films, ribbons and other materials such as filaments of high denier and the strip foils and films used for hat and dress trimmings generally contain substantial proportions of plasticisers in order to render them flexible, and when such materials are immersed in liquid media in order to dye them, difficulties may be experienced in that the plasticiser content of the materials may be partially or completely dissolved out, with the result that the dyed products have a very much reduced flexibility and may even be quite brittle. If it is attempted to re-introduce the plasticiser into the materials, for example by soaking them in a bath containing a plasticiser, it is usually found that the impregnation is unsatisfactory and also that the materials become sticky and tend to adhere.

It has now been discovered that the plasticiser content of such materials may be maintained and even increased during dyeing processes by carrying out the dyeing in a bath containing a plasticiser in a suitable concentration. The plasticiser is preferably the same as that contained in the materials, though, if desired, a different plasticiser may be employed.

The process of the present invention is particularly valuable in the treatment of artificial materials having a basis of cellulose acetate, but is also applicable to the treatment of artificial materials having a basis of cellulose propionate, cellulose butyrate, cellulose nitroacetate, cellulose acetate-propionate and other esters and mixed esters of cellulose, methyl, ethyl and butyl celluloses and other cellulose ethers and mixed ethers and cellulose ether-esters, e. g., ethyl cellulose acetate and oxy-ethyl cellulose acetate. It may also be employed in the coloration of other materials, e. g., textile materials and films made of polymerised vinyl acetate and other resins.

Examples of suitable plasticisers which may be employed are diethyl, dibutyl and diamyl tartrates, benzyl alcohol, benzyl benzoate, ethyl citrate, di- and triacetins and triphenylacetin. Dimethyl and diethyl phthalates have been found to be particularly suitable plasticisers for use in the process of the present invention in the treatment of materials of cellulose acetate and other cellulose esters. The plasticiser may, for example, be present in the dye bath in the amount required to form a saturated solution, or an additional amount of plasticiser may be present in an emulsified state.

The exact concentration of plasticiser in the bath will depend inter alia, upon whether it is desired to maintain or increase the plasticiser content of the materials, and upon the nature and concentration of the plasticiser which they contain.

Any suitable dyestuffs may be employed, but preferably those chosen are soluble in the plasticisers present in the dye baths. Examples of suitable dyestuffs are 4-nitro-2-methoxy benzene-1-azo-4'-dimethylamino benzene, 1-amino-4-hydroxy anthraquinone, 1-methylamino-4-hydroxy anthraquinone, 1:4 di(methylamino) anthraquinone, 2:4 dinitro-4' - amino - diphenyl-amine, 2-nitro-4'-chloro-diphenylamine and the dyestuff sold under the registered trade-mark "Celliton" Fast Black B. T. N. The proportion of dyestuff employed will, of course, depend upon the amount of material to be treated and the depth of shade required. Preferably a bath ratio of about 30:1 based on the materials to be treated is employed. More rapid dyeing is obtained by carrying out the operation at super-atmospheric temperatures, but if delustring of cellulose acetate and similar materials is to be avoided the temperature should not be higher than about 50° C. and is preferably not greater than 45° C., e. g., 40° or 30° C. Suitable times of treatment are of the order of one-half to two hours.

The following is an example of the dyeing of cellulose acetate foil which has been cut into strips of about 1 mm. diameter. The parts are given by weight.

Example 20 parts of 4-nitro-2-methoxy benzene-1-azo-4'-dimethylamino benzene are dissolved by grinding in a mortar with about 900 parts of dimethyl phthalate, and about 25 parts of the emulsifying agent sold under the registered trade-mark "Igepon" dissolved in about 700 parts of water is then added and the mixture is emulsified. The emulsion is then added to about 18,000 parts of water, re-emulsified and run into the dye bath containing about 100,000 parts of water at a temperature of about 50° C. Hanks of strip foil are then immersed in the dye liquor for about 1½ hours, after which they are removed, rinsed with cold water and dried at a temperature of 20–25° C. In this manner well dyed strip foil is obtained having a considerably higher plasticiser content than that of the original foil.

The foil may be dyed other shades in a similar manner by means of other dyestuffs mentioned above.

Instead of dyeing in an aqueous medium materials may be dyed in a medium consisting of an organic solvent containing plasticiser and dyestuff. As examples of suitable organic solvents which may be employed may be mentioned ethyl alcohol and aqueous solutions thereof and of other organic liquids, for example acetone, diacetone alcohol, acetic acid, methylene ethylene ether, glycol monoacetate and ethyl glycol monoacetate.

The process of the present invention is applicable not only to dyeing operations but also generally where it is desired to introduce plasticiser into artificial materials or prevent its removal during treatment with liquid media, for example during delustring, crinkling or weighting operations.

Having described our invention, what we desire to secure by Letters Patent is:

1. Process for the coloration of artificial ribbons, foils, films and other materials having a basis of organic derivatives of cellulose and containing a plasticizer therefor, which comprises treating the materials in a medium comprising a saturated aqueous solution of the plasticizer present in the materials and containing a dyestuff for the materials.

2. Process for the coloration of artificial ribbons, foils, films and other materials having a basis of organic derivatives of cellulose and containing a plasticizer therefor, which comprises treating the materials in a medium comprising an aqueous emulsion of the plasticizer present in the materials and containing a dyestuff for the materials.

3. Process for the coloration of artificial ribbons, foils, films and other materials having a basis of cellulose acetate and containing a plasticizer therefor, which comprises treating the materials in a medium comprising a saturated aqueous solution of the plasticizer present in the materials and containing a dyestuff for the materials which is soluble in the said plasticizer, said medium having a temperature of at most 45° C.

4. Process for the coloration of artificial ribbons, foils, films and other materials having a basis of cellulose acetate and containing a plasticizer therefor, which comprises treating the materials in a medium comprising an aqueous emulsion of the plasticizer present in the materials and containing a dyestuff for the materials which is soluble in the said plasticizer, said medium having a temperature of at most 45° C.

JAMES HENRY ROONEY.
BERNARD SHAW.